Patented Apr. 5, 1932

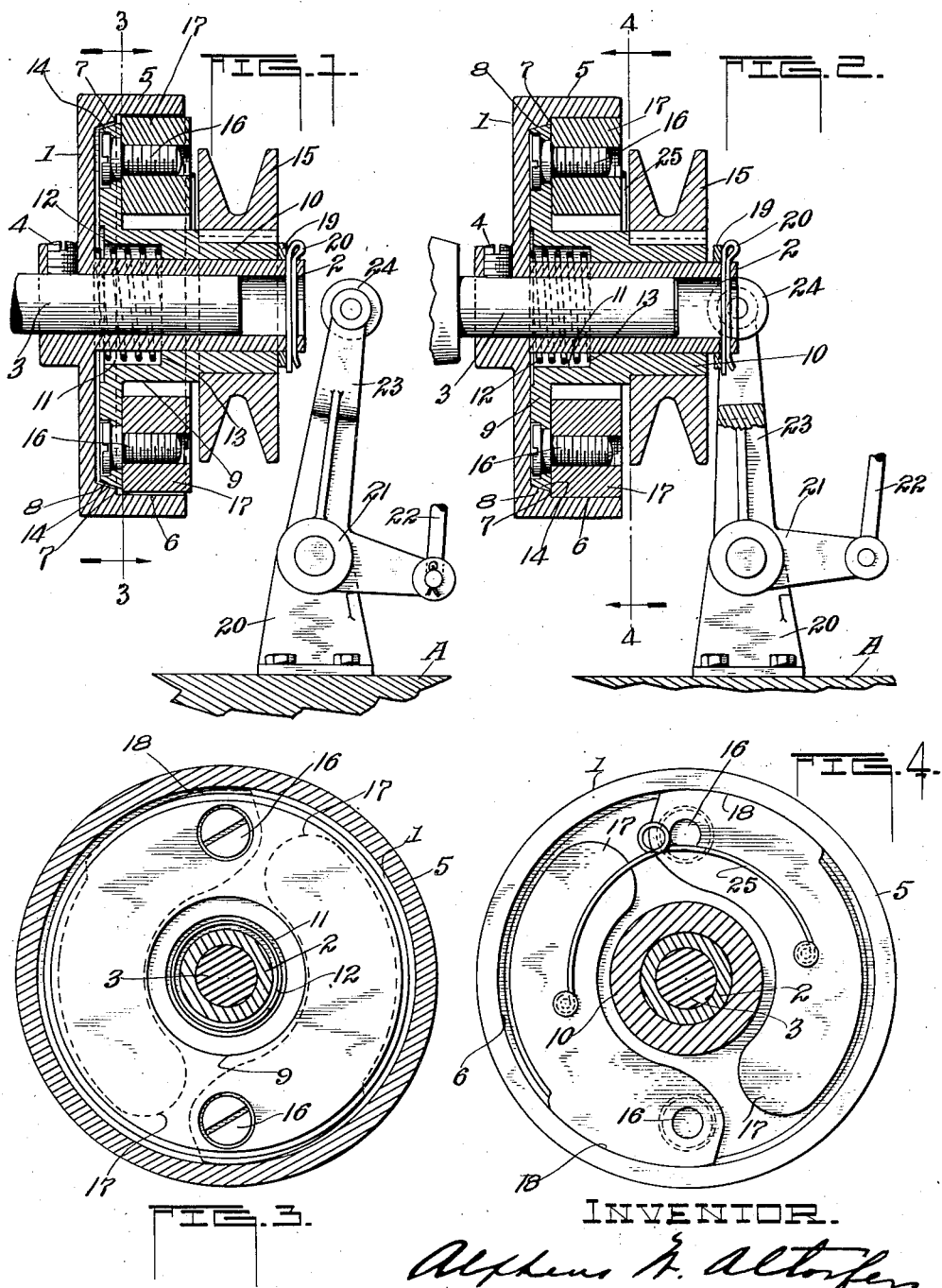

1,852,552

UNITED STATES PATENT OFFICE

ALPHEUS W. ALTORFER, OF PEORIA, ILLINOIS, ASSIGNOR TO ALTORFER BROS. COMPANY, OF EAST PEORIA, ILLINOIS, A CORPORATION OF ILLINOIS

CLUTCH

Application filed July 5, 1929. Serial No. 375,990.

This invention has reference to clutches, and it has for its principal object to provide an efficient yet simple and inexpensive clutch adapted for use in connection with small electric motors which are used as the power unit for operating household devices, such for instance as washing machines and the like.

The invention comprehends a clutch designed to transmit the power of the motor to the machine to be driven and wherein, the clutching elements are of an impositive character so that should the electric power go off the connection between the motor and machine to be driven is broken and must be restored, even after current transmission is restored to the motor, before the machine can be operated. Furthermore, the clutch is so constructed that when connection is desired between the machine and motor the initial clutching of the clutch elements is of a gradual character before full acceleration is obtained, whereby full load cannot be instantaneously thrown on the motor which would result in a flickering of incandescence in the circuit in which the motor is connected, and which is now a common occurrence in present day practice and very objectionable, and furthermore, the clutch is arranged whereby under overload condition there will be a reduction of the normal speed of the motor, which will influence the gripping action of the clutch members and cause a gradual declutching thereof and eventually a complete disconnection of such gripping of the clutch members and such disconnection of the clutch members is of course instant notice to an attendant using the machine that such overload condition must be corrected before operations can be continued.

The invention further comprehends a manually controllable means for moving the clutch elements into initial frictional gripping relation, imposing at the same time sufficient tension in a spring means which will automatically act to restore parts to inoperative relation when power connections are broken and when and in the event overload results in the automatic separation of frictional gripping elements.

The invention further comprehends the use of weights as elements in the clutch connection which are operable under the influence of centrifugal action to bring about an impositive grip and which are restored to inoperative position by weight of gravity, although under the influence of a slight spring action.

That the invention may be more fully understood, reference is had to the accompanying drawings forming part of the description, illustrating a preferred embodiment, in which:—

Fig. 1 is a sectional view through the clutch, the parts being in inoperative position with the control means being shown in elevation;

Fig. 2 is a view similar to Fig. 1 except that the control means has been moved and the clutch parts have assumed operative position;

Fig. 3 is a cross-section as the same would appear if taken on the line 3—3, Fig. 1, looking in the direction of the arrows in said figure, and Fig. 4 is a cross-section as the same would appear if taken on the line 4—4, Fig. 2, looking in the direction of the arrows in said figure.

Like characters of reference denote corresponding parts throughout the figures.

The device preferably comprises an annular flanged housing 1 having an elongated sleeved hub 2 adapted to fit on and be secured to a motor shaft 3 of any suitable electric motor, not shown, but preferably such as may be designed for use in connection with household devices, as for instance, washing machines and the like. A set screw 4 may be the means employed for securing the housing to the motor shaft. The flange 5 of the housing has the interiorly arranged annular concentric frictional gripping surface 6 which is shouldered at 7 and merges into the tapered frictional gripping surface 8.

A sleeved disk 9 is employed which is adapted to have a slidable coacting relation with the flanged housing 1. The sleeve portion 10 of said member encircles the sleeved hub 2 and is adapted for a small degree of axial movement thereon and the said sleeve 10, at its inner end portion is interiorly chambered as at 11 to house a coil spring 12 encircling the hub 2 and bearing, one end against the body of the housing 1 and at its other end bearing against a shoulder 13 forming an end wall of said chamber. The disk portion 9 has a tapered periphery 14 complementary to and adapted to have a frictional gripping contact with the tapered gripping surface 8 of the said housing.

The sleeve 10 has preferably keyed on its outer end and outside the flanged portion of the housing, a driven part 15, which in this instance takes the form of a grooved pulley designed to actuate a belt, not shown, employed to transmit motion from the shaft 3 to a machine mechanism, not shown, as for instance, the transmission mechanism of a washing machine or the like; however, it is to be understood some other character of driven part may be employed without departing from the spirit and intent of the invention.

To the body of the disk 9, are pivotally connected by screws 16, a pair of weights 17, which said weights are preferably confined within the flange of the housing 1 and have surface gripping portions 18 designed for impositive frictional gripping contact with the gripping surface 6 of the flange 5 of the housing. As the clutch is designed, there are two such weights 17 preferably diametrically opposed to each other and capable of oscillatory movement on their pivots, when influenced by centrifugal action, to cause the surface gripping portions 18 thereof to have a frictional gripping relation with the surface 6 of the housing. Furthermore, as the weights are designed, there need be only a slight oscillation to result in a complete contact throughout their gripping surfaces 18 with the gripping surface 6 of the housing, see Figs. 3 and 4.

As explained, the sleeve 10 of the disk 9 is loose on the hub sleeve 2 and the driven part 15 is preferably keyed to said sleeve 10. The spring 12 normally holds the disk out of frictional engagement with the body of the housing and such out-of-contact position of the disk 9 is against a washer 19 on the sleeve hub 2 and a cotter-pin 20 for holding the assembly in cooperative relation.

On the machine frame, which for convenience I have designated A, I provide a bracket 20 and to said bracket is pivotally connected a preferably bell-crank lever 21 to the short arm of which is connected an operator's rod 22, which may extend to any desired point on the machine to be within easy reach of an attendant who may want to set the clutch for action. On the long arm 23 of said lever there is journaled a roller 24, which, when the lever is moved in one direction is caused to bear against the driven part 15 and cause an inward shifting of the disk 9 and cause a frictional gripping coaction between the surface 14 of the disk and the surface 8 of the housing, while at the same time increasing slightly the tension in the spring 12. Assuming the motor to be running and the shaft 3 in operation, motion in the shaft and housing will then be initially imparted to the disk 9. As the disk gains in velocity with the housing, the weights, due to the influence of centrifugal action, will be caused to be brought into frictional gripping relation with the inner surface of the housing and the parts caused, through such impositive grip, to transmit motion through the driven part 15 to the mechanism of the machine. Since the weights are relied on as the medium through which the clutch connection is maintained, it is immaterial if there is a slight recession of the disk and weights, due to expansion of the spring positioning the two elements 1 and 9 in their relation to each other, so that on the dropping back of the weights, through gravity, due to whatever cause, the power connection through the clutch from the motor to the machine is automatically broken.

I prefer to connect the two weights 17 with a substantially weak spring connection 25 to insure unity of action on their recession from contact with the housing, as soon as and when the weights are from under the influence of centrifugal action.

The gripping surfaces 8 and 14, respectively, of the housing and the disk may be considered as the starting surfaces of the clutch and are thereby comparatively shallow as compared with what may be referred to as the normal driving surfaces which comprise the annular surface 6 of the housing and the surface gripping portions of the weights. Under actual operating conditions, the housing may be constantly and continuously operated by the prime mover which is the motor to which the shaft 3 is connected and the power transmitted through the housing which is connected to the shaft cannot be imparted to the driven part 15 or to the machine mechanism to be actuated except through the manually controlled lever which must first be operated to bring the starting surfaces of the clutch members into coacting relation and as a result of the movement which is imparted to the disk, the weights then under the influence of centrifugal action, set up by the rotation of the disk, bring about a clutch relation of the normal driving surfaces of the clutch parts. Under an overload condition, which will reduce the speed of the motor or when the power goes off the line, it is obvious that the driving connection between the normal driving surfaces of the clutch, will by weight of gravity, be moved into declutched relation when the spring will act, if it has not already acted, to bring about a separation of the starting surfaces of the clutch and the driven part thereby placed in a position of rest, and centrifugal action thereafter in the housing will become ineffective, nor can any motion be imparted therethrough except first on the attendant actuating the lever to move the driven part and its associated clutch elements into coacting relation, as explained, with the housing connected with the prime mover, in this instance, the motor.

What I claim is:—

1. In a clutch mechanism, in combination, driving and driven members, each having coactable starting surfaces whereby an initial starting action may be set up between said members when one is moved into engagement with the other, and said members being also provided with normal driving surfaces, such surface of the driven member comprising weights operable under the influence of centrifugal action, set up by the rotation of their member, whereby the driving surfaces are brought into coactable relation and said weights returnable to inoperative position by weight of gravity under conditions of overload, a spring means to separate the starting surfaces, and manually operable means for moving the driven member into initial starting relation with said driving member.

2. In a clutch mechanism, in combination, driving and driven members, said driving member adapted for continuous operation by a prime mover and having a frictional gripping starting surface and a normal frictional gripping driving surface of greater area than said starting surface, said driven member operable only when in coactable relation with the starting and driving surfaces of said driving member and provided with a frictional gripping starting surface adapted for coactable contact with the starting surface of said driving member, and weights pivotally connected with said driven member and having frictional gripping surfaces adapted to have coactable gripping relation with the driving surface of said driving member under the influence of centrifugal action set up by the rotation of the driven member, and manually operable means for moving the driven member into initial starting relation with said driving member.

3. In a clutch mechanism, in combination, driving and driven members, said driving member adapted for continuous operation by a prime mover and having a frictional gripping starting surface and a normal frictional gripping driving surface of greater area than said starting surface, said driven member operable only when in coactable relation with the starting and driving surfaces of said driving member and provided with a frictional gripping starting surface adapted for coactable contact with the starting surface of said driving member, weights pivotally connected with said driven member and having frictional gripping surfaces adapted to have coactable gripping relation with the driving surface of said driving member under the influence of centrifugal action set up by the rotation of the driven member, means connected with the driven member for transmitting the motion set up in said driven member, and manually operable means for moving the driven member into initial starting relation with said driving member.

4. In a clutch mechanism, in combination, driving and driven members, the latter loosely carried by and slidable on said driving member, a power transmitting element connected to be operated by said driven member, each of said members having impositive frictional gripping starting surfaces and normal impositive frictional gripping driving surfaces, the latter surfaces of the driven member included in and comprising weights pivotally connected with said driven member and operable under the influence of centrifugal action set up by the rotation of the driven member, means to restore the driven member to a position of rest on the driving member, and manually controllable means for moving said driven member from a position of rest into initial starting relation with said driving member.

5. In a clutch mechanism, in combination, driving and driven members, the latter loosely carried by and slidable on said driving member, a power transmitting element connected to be operated by said driven member, each of said members having impositive frictional gripping starting surfaces and normal impositive frictional gripping driving surfaces, the latter surfaces of the driven member included in and comprising weights pivotally connected with said driven member and operable under the influence of centrifugal action set up by the rotation of the driven member, means to restore the driven member to a position of rest on the driving member, and a manually operable lever having means for non-frictional engagement with said driven member whereby to move said driven member into initial starting relation with said driving member.

6. In a clutch mechanism, in combination, a driving member, a driven member, means for effecting an impositive starting relation between said members, means operable automatically on the rotation of said driven element for impositively driving said driven element from the driving element, said driving means responsive to the load and releasable by weight of gravity, means for manually effecting an initial starting relation between said members, and means for separating said members into non-coacting relation on the release of said driving means.

In witness whereof, I have hereunto affixed my hand and seal this 2nd day of July, 1929.

ALPHEUS W. ALTORFER.